(No Model.)  3 Sheets—Sheet 1.
G. HAYES.
WHEEL FOR BICYCLES.
No. 582,126. Patented May 4, 1897.
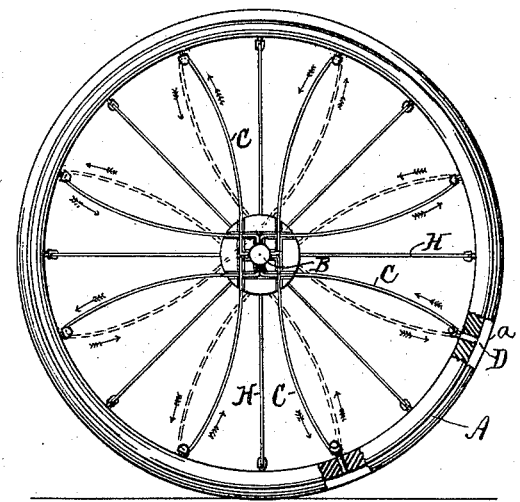
Fig. 1.
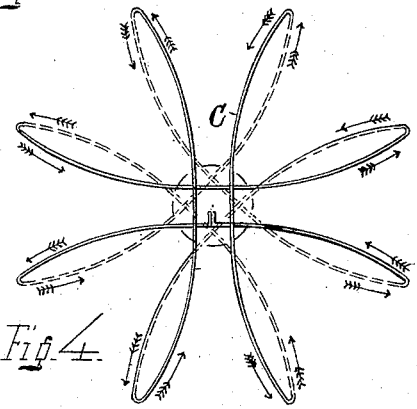
Fig. 4.
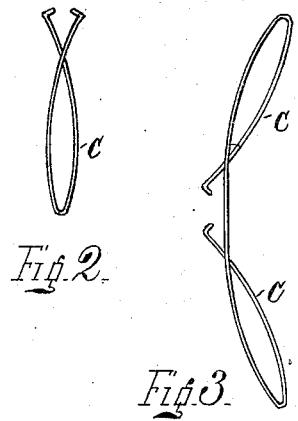
Fig. 2.
Fig. 3.
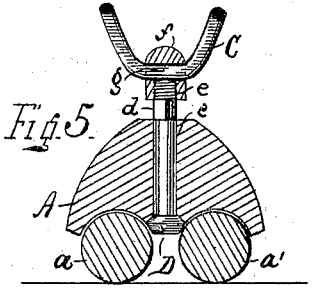
Fig. 5.
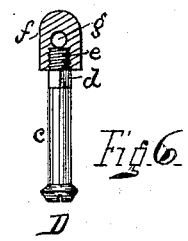
Fig. 6.
Witnesses
Arthur Hayes
Harry Black
Inventor
Geo. W. Hayes.
THE NORRIS PETERS CO., PHOTO-LITHO., WASHINGTON, D. C.

(No Model.) 3 Sheets—Sheet 2.
G. HAYES.
WHEEL FOR BICYCLES.
No. 582,126. Patented May 4, 1897.
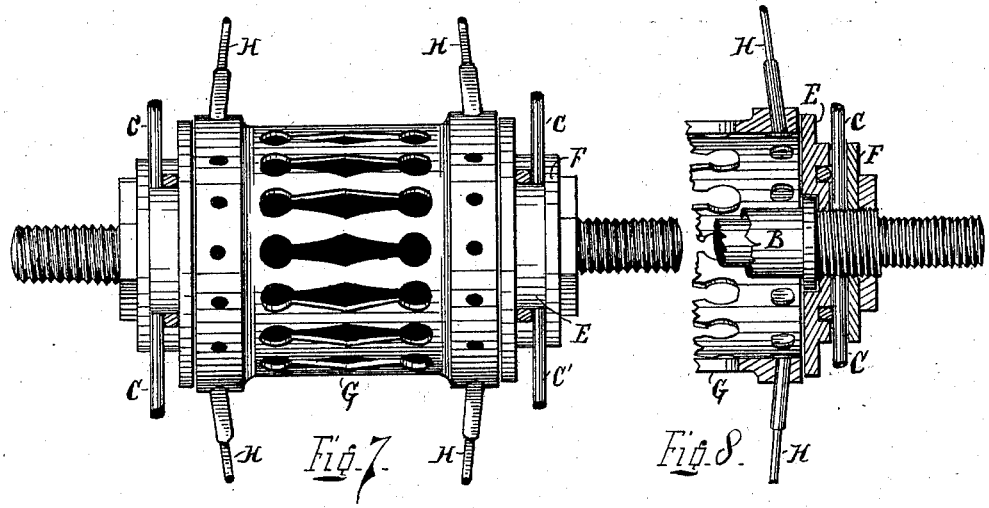
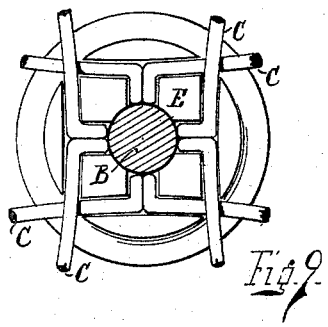
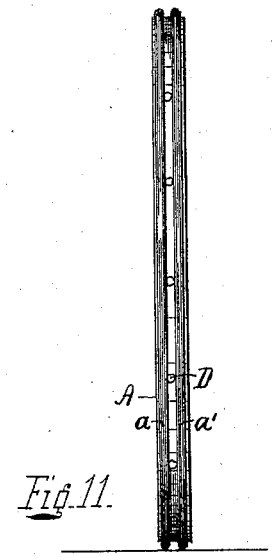
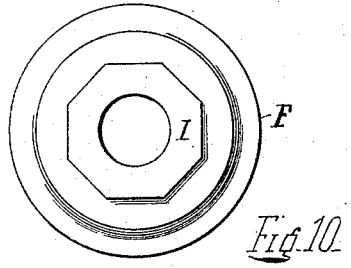
Witnesses:
Arthur Hayes
Harry Black
Inventor:
Geo H Hayes (No Model.) 3 Sheets—Sheet 3.

G. HAYES.
WHEEL FOR BICYCLES.

No. 582,126. Patented May 4, 1897.

Witnesses:
Arthur Hayes
Harry Black

Inventor:
Geo. Hayes.

UNITED STATES PATENT OFFICE.

GEORGE HAYES, OF NEW YORK, N. Y.

WHEEL FOR BICYCLES.

SPECIFICATION forming part of Letters Patent No. 582,126, dated May 4, 1897.

Application filed April 8, 1896. Serial No. 586,697. (No model.)

*To all whom it may concern:*

Be it known that I, GEORGE HAYES, a citizen of the United States, and a resident of the city, county, and State of New York, have invented a new and useful Improvement in Wheels for Bicycles or other Vehicles, of which the following is a specification.

My invention relates to wheels for bicycles, unicycles, tricycles, quadricycles, motor-carriages, and other vehicles in general; and my invention consists of a construction of wheel in which a double facing of flexible and resilient spokes sustain the hub in its true central position, the entire system of spokes being formed as continuous lengths of spring-metal wire and each length bent to constitute two or more spokes, and where in contact with the hub secured thereto and the bend of each length of wire at the rim secured by eyebolts thereto, with the spoke-wire passed through the eye of the bolt.

It further consists of a system of double rigid spokes sustaining a central supplemental nave or auxiliary hub, each length of spoke-wire forming a loop at the rim and secured thereto by eyebolts.

It further consists of a construction of rim provided with two tires of a hard unyielding material.

It further consists of the mechanical devices whereby the flexible and resilient spokes are secured to the hub, and also of the various devices and combination of devices which serve to constitute the wheel a completed whole, all as hereinafter more fully described, and pointed out in the claims, reference being had to the accompanying drawings, in which—

Figure 12:
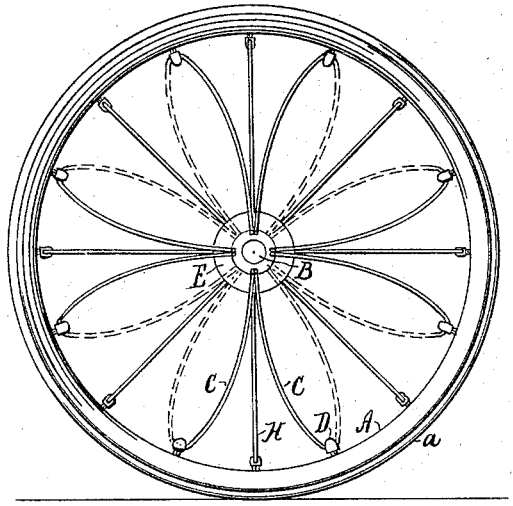
Figures 13, 14:
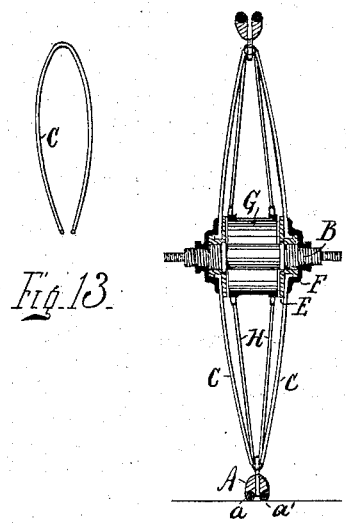
Figure 15:
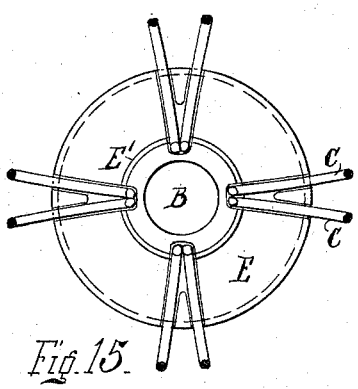
Figure 16:
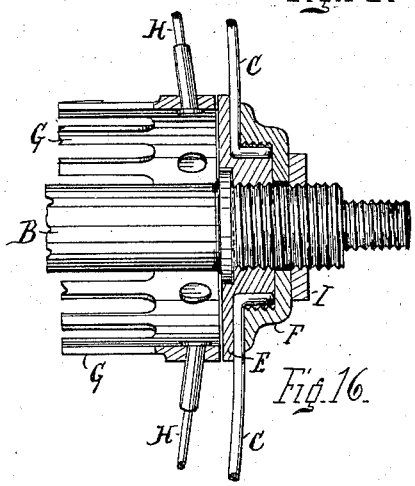
Figure 17:

Figure 1 represents a side or face elevation of the wheel with parts broken away to show constructive features. Dotted lines indicate spokes of the reverse face of the wheel. Fig. 2 shows alone two spokes formed of one continuous length of spring-wire as a loop. Fig. 3 shows alone four spokes of one continuous length of spring-wire as two loops. Fig. 4 is a side elevation of spokes alone all formed of one continuous length of spring-wire, affording sufficient spokes for the entire wheel, all bent at the outermost extremity as loops. Fig. 5 is a sectional view through the rim of the wheel and double tire, illustrating the manner of securing spokes to rim by eyebolts. Fig. 6 shows the entire bolt alone. Fig. 7 is an elevation of the subsidiary nave or auxiliary hub with end of main hub and axle, also showing ends of spokes in connection. Fig. 8 is a sectional view showing end of main hub, auxiliary hub, end of wire spokes, and means of securing the spoke-wires to hub. Fig. 9 is a face view of a hub-plate, showing ends of spoke-wires therein. Fig. 10 is an exterior face view of the covering-plate fitting over the wires and threaded upon the hub, also the lock-nut by which the whole is rendered secure. Fig. 11 is an elevation of the rim of the wheel edgewise, showing the tread and tires. Fig. 12 is a face elevation of a wheel in which the arrangement of spokes at the hub is varied from that of Fig. 1 with covering-plate removed. Dotted lines show spoke-wires as they return to form reverse face of wheel. Fig. 13 is a view of one spoke-wire alone. Fig. 14 is a vertical cross-section of the wheel of Fig. 12. Fig. 15 is a plan view of the outer face of one of the clutch-plates at the hub with ends of spokes shown therein. The edge of the covering-plate is indicated by dotted lines. Fig. 16 is a sectional view showing about one-half of the hub portion of the wheel with ends of spokes, clutch-plate, covering-plate, &c. Fig. 17 is a sectional view of the covering-plate alone.

On the drawings, A indicates the rim or outer peripheral border of the wheel. Any rim or tire heretofore known may be used with the other parts of this invention, but I prefer to use the style shown sectionally in Fig. 5, with double tire, as two round hoops, so arranged that a groove is constituted between them all around the edge of the wheel, affording a good grip upon the ground and preventing lateral sliding or slipping as the wheel treads with its two rounded edges to the ground.

B indicates the hub or nave of the wheel. This may be of any style heretofore in use, especially those used for bicycles generally, with flanges near each end.

C indicates the system of flexible and resilient spokes between rim and hub, sustaining the hub flexibly and resiliently, allowing it to oscillate or vibrate as affected by pressure or shock, and by which the rim is looped to the hub.

In Fig. 1 the dotted lines represent the spokes forming the reverse face of the wheel and the arrows show the direction of the run. As shown in said figure, each two spokes are formed of one continuous length of spring metal at the rim A, passed through eyes or eyebolts D and alternating from side to side of the wheel, each end of the spoke-wire secured to the hub at opposite ends thereof, the set of eight wires constituting the two faces of the wheel, as sixteen spokes.

At the hub the metal spoke-wire is held to the hub by a clutch-plate E, one to each side of the wheel, which may be formed as part of the hub or as separate plates. The clutch-plates E are formed, as shown in Figs. 7, 8, and 9, with grooves to their faces, in which the metal spoke-wire rests, and keys, as shown in Fig. 9. Their ends are bent to form hooks, which set into grooved places formed to receive them. Consequently the spokes C are rigidly secured to the hub.

The spoke-rods C have a curved form between hub and rim, also a curved form in cross-section, so that a flexibility and resiliency is secured throughout, and the effect of pressure or shock when received affects the whole system of spokes and all act together, coöperating to overcome and keep unpleasant effects from the rider and also to conduce to the longevity of the wheel. This system of spokes is the first important feature of this invention, but the same may be modified to some degree.

Instead of the system being formed of each two spokes one continuous length, as in Figs. 1 and 2, any number may be so formed, as shown by Figs. 3 and 4, always so that loops are formed at the rim passing through the eyebolts D. Next I place at the hub or nave encircling it a collar or supplemental nave G, so placed that its inner surface is approximately about one-half of an inch from the surface of the spindle portion of the hub all around the same when the hub is quiescent, and I sustain this collar G by straight rigid spokes H, radiating and extending therefrom to the rim, doubling at the rim to form a pair, as shown in Fig. 10 sectionally, in this case also as two stretches of one continuous piece of metal, at the rim passed through an eye or eyebolt D in the rigid spokes G, but when I choose to bring some of them between a pair of the resilient spokes C, I pass those spokes through an eye specially formed therefor at the head of eyebolts D, and at the collar G the ends are secured thereto by the usual or any other suitable manner, so that the collar or supplemental nave G is held rigidly and the hub proper, B, may oscillate or vibrate under the influence of pressure or shock within its cylindrical interior, restricted as to any excess of motion by its accidental contact therewith. The collar or supplemental nave therefore serves as a restricting device limiting the scope of the hub motion. The lateral width of the collar G is limited so as to enable the end flanges of the hub to straddle it, and the "play" is entirely within them. In Fig. 2 the form of spoke-wire illustrated singly is the form used for the flexible and resilient spoke-wires C of Fig. 1, eight of which constitute the system. In Fig. 4 the entire system of resilient spokes C is shown as composed of one continuous wire, so bent as to constitute both faces of the wheel and loop the rim to the hub. The preferable form is that of Figs. 1 and 2, however, as most convenient and economical of time when assembling the parts in manufacture of wheels.

Figs. 5 and 11 illustrate the preferable form of tire. As shown, I use two hoops $a\, a'$, preferably round in cross-section, but such may be made with rounded face exteriorly only, and I make them of steel or other hard and unyielding material. Hard rubber might be used therefor. The eyebolts D are composed of outer part $c$, passed inward through the rim A and formed with a square or angular portion $d$ to admit of a wrench being operated thereupon for turning it, and a threaded portion $e$ next above the square, with threaded thereon an eye-block $f$, perforated at $g$, and through the perforation $g$ the spring spoke-wire is passed, and by turning the part $c$, by wrench applied at $d$, the eye-block is drawn toward the rim, tightening the spoke-wires, while the end of the outer portion $e$ impinges upon the spoke-wire, securing it against any sliding motion within the perforation.

In Figs. 1 to 11, inclusive, it may be seen that the metal spoke-wires form lines across the hub, those to one face diagonally to those of the other face, and the arrangement is such that to each face is formed a resemblance to a Greek cross, and as both sides show the cross seems double, rendering the wheel attractive.

In Figs. 12 to 17, inclusive, a modification in respect to the arrangement of the spokes at their junction with the hub is shown, with also a modification in the hub-plate, accommodating it thereto. In this case the spoke-wires do not lie so as to form continuous lines across the hub, but those wires of every two having opposing curves come together in a groove, as at I, formed in the clutch-plate, with their end hooks fitting into a groove J, formed in a projecting portion K of the clutch-plate, having its peripheral surface formed with thread upon which the covering-plate is threaded, inclosing and covering the ends of all the spokes securely. Beyond the covering-plate a nut L, which may be a lock-nut, is threaded upon the hub.

In both arrangements of spokes, Figs. 1 to 11, inclusive, and that of Figs. 12 to 17, inclusive, the ends of the spokes are bent angularly to constitute hooks, in both instances resting in grooves of the clutch-plate and secured by a covering-plate exteriorly.

In Fig. 15 the back face of each of the clutch-plates E may be formed to fit against or over and upon the flanges of the hub after the manner shown, or may be formed as a flange of the hub solid therewith. Outside of the clutch-plate a nut I is used. The covering-plate F is threaded to the projecting part of the clutch-plate. The outer edge of the thread is shown at E, Fig. 15, which is formed so that the thread of the covering-plate will set close against the hooks of the spokes C, gripping them. Between the hub B and the supplemental nave or collar G an elastic cushion may be used to obviate any risk of shock resulting from contact of the two naves if they touch at times. I use what is technically termed "sponge-rubber" as most suitable.

What I claim as new, and desire to secure by Letters Patent, is—

1. In a wheel for bicycles and other vehicles, a set of spring-metal spoke-wires secured to rim and hub, each folded and formed as a loop, the two sides of which are curved as a simple arc with convexity from each other essentially as set forth.

2. In a wheel for bicycles and other vehicles, a set of spring-metal spoke-wires secured to rim and hub, each folded and formed as a loop, the two sides of which are curved as an arc with convexity from each other to secure resiliency, and within the same a set of straight rigid metal spokes each folded and formed as a loop, the sets of resilient spokes and rigid spokes both secured to the same rim, but each set provided with a nave separate and distinct from the other essentially as set forth.

3. In a wheel for bicycles and other vehicles, a loop forming a double resilient spoke of one piece of metal wire, having its two ends hooked to the hub at opposite ends thereof, and midway of the same at the fold secured to the rim by an eyebolt, the two portions of the spoke-wire between hub and rim each curving as an arc, essentially as set forth.

4. In a wheel for bicycles and other vehicles, the combination of rim A, hub or nave B, resilient spokes C, eyebolts D, clutch-plate E, collar or supplemental nave G, and rigid spokes H, all constructed, arranged and combined essentially as set forth.

GEO. HAYES.

Witnesses:
ARTHUR HAYES,
HARRY BLACK.